United States Patent [19]
Hastings et al.

[11] Patent Number: 5,957,596
[45] Date of Patent: Sep. 28, 1999

[54] SPEED CONTROL OF A LABEL PRINTING APPARATUS

[75] Inventors: Nicholas James Hastings, Cottenham; Geoffrey Stuart Howe, Newcastle Upon Tyne, both of United Kingdom; Geert Heyse, Leeuwerikstraat, Belgium

[73] Assignee: Esselte N.V., Sint-Niklaas, Belgium

[21] Appl. No.: 08/879,112

[22] Filed: Jun. 19, 1997

[30] Foreign Application Priority Data

Jul. 19, 1996 [EP] European Pat. Off. ............... 96111707

[51] Int. Cl.$^6$ ...................................................... B41J 11/26
[52] U.S. Cl. ........................ 400/615.2; 400/279; 400/76; 400/61
[58] Field of Search ................................. 400/615.2, 279, 400/320, 322, 54, 76, 61

[56] References Cited

U.S. PATENT DOCUMENTS

| | | |
|---|---|---|
| 3,990,559 | 11/1976 | Martin et al. . |
| 4,169,991 | 10/1979 | Ross . |
| 4,521,813 | 6/1985 | Yoshida et al. . |
| 4,653,940 | 3/1987 | Katsukawa ................................ 400/54 |
| 5,043,748 | 8/1991 | Katayama et al. . |
| 5,152,619 | 10/1992 | Niikawa .................... 400/54 |
| 5,326,183 | 7/1994 | Kasai ....................... 400/322 |
| 5,534,890 | 7/1996 | Krug et al. . |
| 5,608,443 | 3/1997 | Palmer et al. . |

FOREIGN PATENT DOCUMENTS

| | | | |
|---|---|---|---|
| 534 799 A2 | 9/1992 | European Pat. Off. | ......... B41J 11/70 |
| 0 639 022 A1 | 8/1994 | European Pat. Off. | ......... H04N 1/04 |
| 0 742 103 A1 | 11/1995 | European Pat. Off. | ........... B41J 3/36 |
| 41 13299 A1 | 4/1991 | Germany | ....................... A01B 51/04 |
| 63-188059 | 3/1988 | Japan | ................................. B41J 3/10 |
| 8-001985 | 1/1996 | Japan | .............................. B41J 2/375 |
| WO A90 09629 | 8/1990 | WIPO | ............................. G06F 3/153 |

*Primary Examiner*—Edgar Burr
*Assistant Examiner*—Charles H. Nolan, Jr.
*Attorney, Agent, or Firm*—Pennie & Edmonds LLP

[57] ABSTRACT

The present invention relates to a label printing apparatus for printing image data onto a tape. The label printing apparatus has a memory for storing image data to be printed onto the tape, a print head for recording the image data dot wise onto the tape in subsequent printing cycles, a platen for conveying the recording medium relative to the print head and means for determining the number of dots to be activated in each printing cycle. In order to obtain high print quality, a speed adjuster is provided to control the speed of the platen in response to the number of image data stored in the memory and the number of dots to be activated in the present printing cycle. The present invention also relates to a method for controlling the platen and the print head to avoid misalignment of subsequent printing lines, when the platen must stop due to lack of data in the memory.

19 Claims, 3 Drawing Sheets

SPEED CONTROL OF A LABEL PRINTING APPARATUS

FIELD OF THE INVENTION

The present invention relates to a tape printing apparatus and in particular to the speed control of the tape during printing.

BACKGROUND OF THE INVENTION

Known tape printing apparatus are disclosed in U.S. Pat. Nos. 4,927,278, 4,966,476 and 4,815,871. The printers each include a printing device having a cassette receiving bay for receiving a cassette or tape holding case. In U.S. Pat. No. 4,815,871, the tape holding case houses an ink ribbon, a transparent image receiving tape and a double-sided adhesive tape. The adhesive tape is secured at one of its adhesive coated sides to the image tape after printing and which has a backing paper peelable from its other adhesive side. With each apparatus, the image transfer medium (ink ribbon) and the image receiving tape (substrate) are in the same cassette.

A different type of tape printing apparatus is described, for example, in U.S. Pat. No. 5,458,423, the content of which is herein incorporated by reference. In this printing apparatus, the substrate tape is similar to that described in U.S. Pat. No. 4,815,871 but is housed in its own tape holding case while the ink ribbon is similarly housed in its own tape holding case.

In all of these devices, the image receiving tape passes in overlap with the ink ribbon to a print zone. The print zone consists of a fixed print head and a platen against which the print head can be pressed to cause an image to transfer from the ink ribbon to the image receiving tape. There are many ways of doing this, including dry lettering or dry film impression, but the most common way at present is thermal printing where the print head is heated and the heat causes ink from the ink ribbon to be transferred to the ink receiving tape. Alternatively, the print head may be in direct contact with a thermally sensitive image receiving tape whereby when the print head is heated, an image is defined on the image receiving tape.

U.S. Pat. No. 5,043,748 discloses an ink jet recording apparatus wherein the recording medium is transported by means of a DC motor. In order to avoid stoppage of the motor due to the lack of image data to be printed, which results in poor print quality, it is proposed to control the speed of the motor to depend on the speed of data transfer from a host computer.

A disadvantage of known tape printers is that they generally have a constant print speed, such that the printing process may stop due to lack of image data awaited from a connected host computer. Further, they require a relatively large and expensive power supply, which must be capable of providing the print head with power even when a full dot line is not printed.

Therefore, it is desirable to provide a label printing apparatus which overcomes the disadvantages of the state of the art. The present invention provides a label printing apparatus which meets these requirements.

SUMMARY OF THE INVENTION

The present invention relates to a label printing apparatus for printing image data onto a recording medium. The label printing apparatus comprises (a) memory means for storing image data to be printed onto the recording medium, (b) recording means for recording the image data dot wise onto the recording medium in subsequent printing cycles, (c) conveying means for conveying the recording medium relative to the recording means, (d) means for determining the number of dots to be activated in each printing cycle and (e) speed adjustment means for controlling the speed of the conveying means based on the number of image data stored in the memory means or the number of dots to be activated in the present printing cycle. Preferably, the recording means is a thermal print head and the conveying means has a DC motor.

In the label printing apparatus of the present invention, the speed adjustment means calculates a first predetermined speed dependent on the number of image data dots stored in the memory means and a second predetermined speed dependent on the number of dots to be activated in the present printing cycle, and controls the speed of the conveying means according to the lower one of the first predetermined speed and the second predetermined speed. The speed adjustment means reduces the first predetermined speed when the number of image data stored in the memory means is below a predetermined threshold level.

More specifically, when the number of image data in the memory means falls below a first threshold level, the speed adjustment means maintains the first predetermined speed at a constant. When the number of data in the memory means exceeds a second threshold level, the speed adjustment means maintains the first predetermined print speed at a maximum speed independent of the amount of image data in the memory means. When the number of data exceeds the first threshold level and is below the second threshold level, the speed adjustment means increases the first predetermined print speed linearly with the number of data in the memory means.

In addition, the speed adjustment means determines the second predetermined speed depending on the number of dots activated in a previous printing cycle. The speed adjustment means reduces the second predetermined speed linearly with respect to a maximum speed depending on a value V when the value V exceeds a predetermined threshold level, wherein the value V is determined according to the equation $$V = A \times B + C,$$

wherein C is the number of dots to be activated in the present printing cycle and B is the value V of the previous printing cycle and A is between 0 and 1.

In the label printing apparatus of the present invention, means is provided for controlling the energy submitted to the recording means in each printing cycle in response to the speed of the conveying means.

The label printing apparatus according to the present invention further comprises an interface connectable to a host. After the beginning of a data transmission from a host, the speed adjustment means activates the conveying means only when the amount of data stored in the memory means exceeds a predetermined threshold level. Means is also provided for switching a power supply of the label printing apparatus on in response to incoming data from the host.

In addition, the label printing apparatus of the present invention comprises means for detecting the movement of one of the recording medium or an ink ribbon, and means for providing an error message in response to an error in the recording medium or ink ribbon movement detected by the movement detecting means. The movement detecting means comprises a microswitch which interacts with at least one of a cam operatively connected to a tape unwind wheel, a cam operatively connected to an ink ribbon unwind wheel and a cam operatively connected to an ink ribbon rewind wheel.

In the label printing apparatus of present invention, the speed adjustment means drives the conveying means at a minimum print speed when the memory means is provided with printing data at a rate which is lower than that at which data is sent to the recording means when printing at the minimum print speed. The speed adjustment means switches the power of the conveying means off before the number of data in the memory means becomes zero. The recording means is controlled to print the data stored in the memory means onto the recording medium when the conveying means stops entirely. The recording means is controlled by a recording medium movement sensing means for sensing the movement of the recording medium. The speed adjustment means controls the conveying means to resume conveying and the recording means to resume recording once the number of data stored in the storing means exceeds a predetermined threshold level.

The recording means is provided with an enlarged recording energy during printing of a first printing line with respect to printing of printing lines following the first printing line. The recording means is disabled when the conveying means is not moving.

The present invention relates to a label printing apparatus for printing image data onto an elongated recording medium. The label printing apparatus comprises (a) a memory for storing image data to be printed onto the recording medium, (b) a print head for recording the image data dot wise onto the recording medium in subsequent printing cycles, (c) a motor for conveying the recording medium relative to the print head, (d) a print buffer for determining the number of dots to be activated in each printing cycle and (e) a speed adjuster for controlling the speed of the motor based on the number of image data stored in the memory or the number of dots to be activated in the present printing cycle.

The basic principle of the present invention is to control the speed of the conveying means in response to two factors: the number of image data available for printing and the number of dots to be activated, i.e. energized and printed in the respective printing cycle. This allows to adjust the print speed optimally. Hence, on one hand any undesired stop of the tape due to the lack of printable data can be avoided and on the other hand the power supply can be chosen smaller and less expensive, as the print speed is reduced when a high part of the printed image is black such that the time between two successive printing cycles is longer and the average required power is therefore lower.

Although several possibilities exist for the dependence between the print speed on one hand and the number of image data and the number of activated print dots on the other hand, it is proposed that the speed adjustment means determines a first predetermined speed depending on the number of image data stored in the memory means and a second predetermined speed depending on the number of dots to be activated in the present printing cycle. The speed of the conveying means is controlled according to the lower one of the first predetermined speed and the second predetermined speed. This is a relatively simple procedure and can be performed quite fast. Further, it is assured that the highest possible printing speed is used, as long as it is not necessary to reduce it.

It is proposed to control the energy submitted to the recording means in the respective printing cycles depending on the speed of the conveying means. This can be performed as in U.S. Pat. No. 5,534,890, the contents of which being incorporated herein by reference.

In another preferred embodiment, the label printing apparatus is provided with means for switching the power supply on in response to incoming data from a host computer independent of the power switch of the label printing apparatus. This is very user-friendly, as the user does not have to switch the label printing apparatus on each time he prints a label. The same means can further switch the power supply into a low power mode when for a predetermined time no data has arrived from the host. It should be noted that such means for switching the power supply on and off must have an independent power supply.

Further, it is proposed to provide the label printer with an error detecting means for the movement of the image receiving tape and/or of the ink ribbon tape. Appropriate error messages can also be sent to the host and/or shown on a display of the label printing apparatus. The movement of the tape and/or ink ribbon can be investigated by means of a microswitch interacting with a cam operatively connected to a tape unwind wheel. Alternatively or additionally, a cam operatively connected to an ink ribbon unwind wheel and/or a cam operatively connected to an ink ribbon rewind wheel can be implemented.

In order to overcome misalignments of subsequent printing lines caused by a stop due to the lack of data form a source, a label printing apparatus is provided for printing image data onto a tape-like recording medium according to another preferred embodiment of the present invention. The label printing apparatus comprises memory means for storing image data to be printed onto the tape-like recording medium; recording means for recording the image onto the tape-like recording medium; conveying means for conveying the tape-like recording medium relative to the recording means; and speed adjustment means for controlling tho speed of the conveying means in consideration of the number of image data stored in the memory means.

The speed adjustment means in the label printing apparatus drives the conveying means with a minimum print speed when a rate with which the memory means are provided with printing data is lower than the rate with which data are sent to the recording means when printing with the minimum print speed. The speed adjustment means switches the power of the conveying means off before the number of data in the memory means becomes zero. The recording means is controlled to print the data stored in the memory means onto the tape-like recording medium during the time period in which the conveying means stop entirely. The recording means is controlled by a tape movement sensing means for sensing the movement of the tape. The speed adjustment means controls the conveying means to resume conveying and the recording means to resume recording once the number of data stored in the storing means has exceed a predetermined threshold.

BRIEF DESCRIPTION OF THE DRAWINGS

For a better understanding of the present invention and as to show how the same may be carried into effect, reference will now be made to the accompanying drawings in which.

DESCRIPTION OF THE PREFERRED EMBODIMENTS

Figure 1:
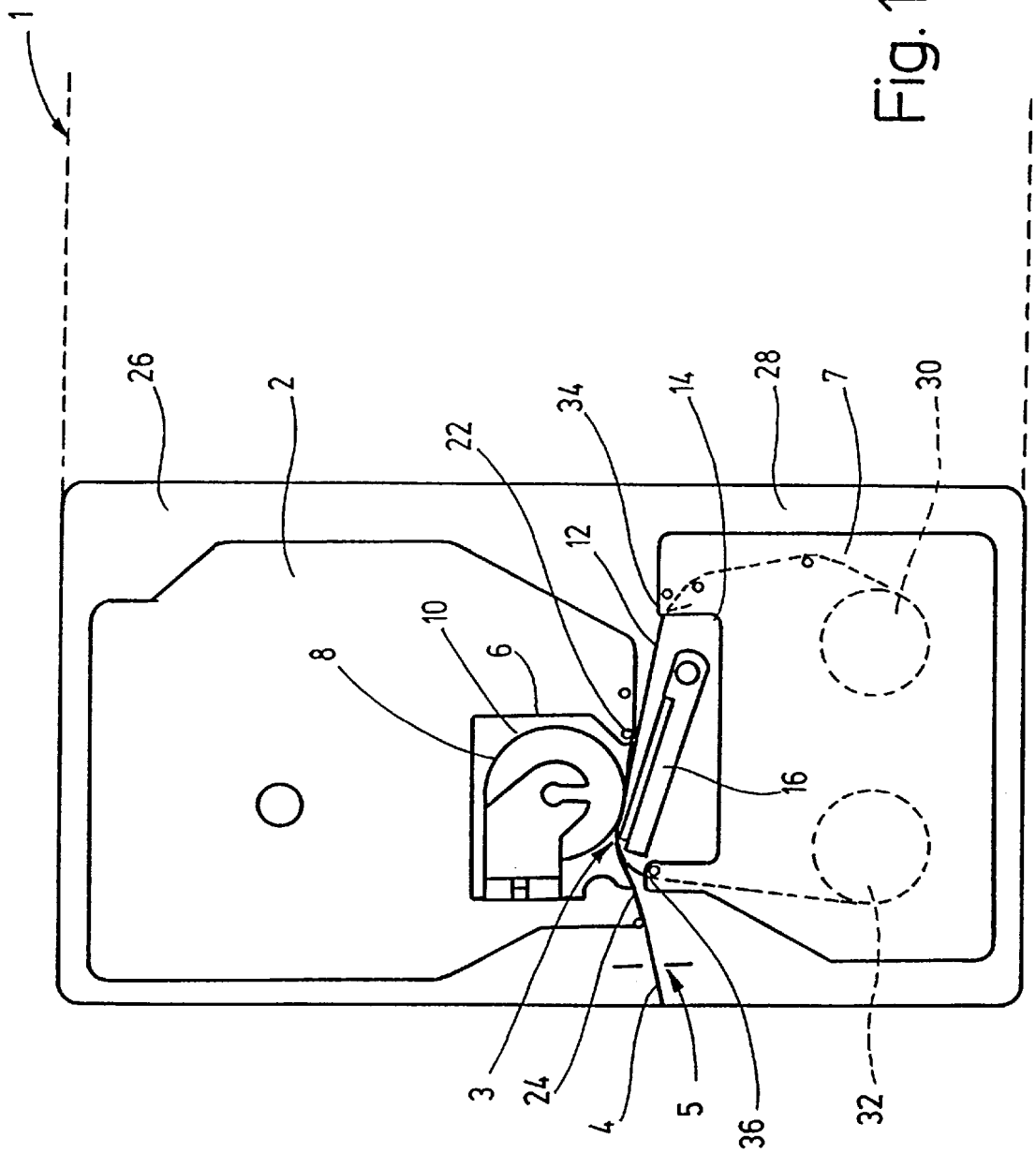
FIG. 1 is a plan view showing a printing mechanism of a label printing apparatus of the present invention.

FIG. 1 shows in plan view two cassettes arranged in a printing device 1, which can be a printer 1, or a printing apparatus 1. The upper cassette 2 is located in a first cassette receiving portion 26 and contains a supply of an image receiving tape 4. The image receiving tape 4 passes through a print zone 3 of the printing device 1 to an outlet of the printing device 1. The image receiving tape 4 comprises an upper layer for receiving a printed image on one of its surfaces and having its other surface coated with an adhesive layer to which is secured a releasable backing layer. The cassette 2 has a recess 6 for accommodating a platen 8 of the printing device 1, and guide portions 22,24 for guiding the image receiving tape 4 through the print zone 3. The platen 8 is mounted for rotation within a cage moulding 10. As an alternative, the platen 8 could be mounted for rotation on a pin.

The lower cassette 7 is located in a second cassette receiving portion 28 and contains a thermal transfer ribbon 12. The thermal transfer ribbon 12 extends from a supply spool 30 to a take-up spool 32 within the cassette 4. The thermal transfer ribbon 12 extends through the print zone 3 in overlap with the image receiving tape 4. The cassette 7 has a recess 14 for receiving a print head 16 of the printer 1 and guide portions 34, 36 for guiding the ink ribbon 12 through the print zone 3.

The print head 16 is movable between an operative position and an inoperative position. In the operative position, as shown in FIG. 1, the print head 16 is in contact with the platen 8 and holds the thermal transfer ribbon 12 and the image receiving tape 4 in overlap between the print head 16 and the platen 8. In the inoperative position, the print head 16 is moved away from the platen 8 to release the thermal transfer ribbon 12 and the image receiving tape 4. In the operative position, the platen 8 is rotated to cause image receiving tape 4 to be driven past the print head 16 and the print head 16 is controlled to print an image onto the image receiving tape 4 by thermal transfer of ink from the ribbon 12. The print head 16 is a conventional thermal print head having an array of pixels each of which can be thermally activated in accordance with the desired image to be printed.

The printing device 1 has a lid which is not shown but which is hinged along the rear of each cassette receiving portion 26,28 and which covers both cassettes 2,7 when in place.

A DC motor drives the platen 8 continuously so that subsequently a column of print is printed on the image receiving tape 4. The platen 8 drives the image receiving tape 4 through the print zone 3 under the action of its own rotation.

Figure 2:
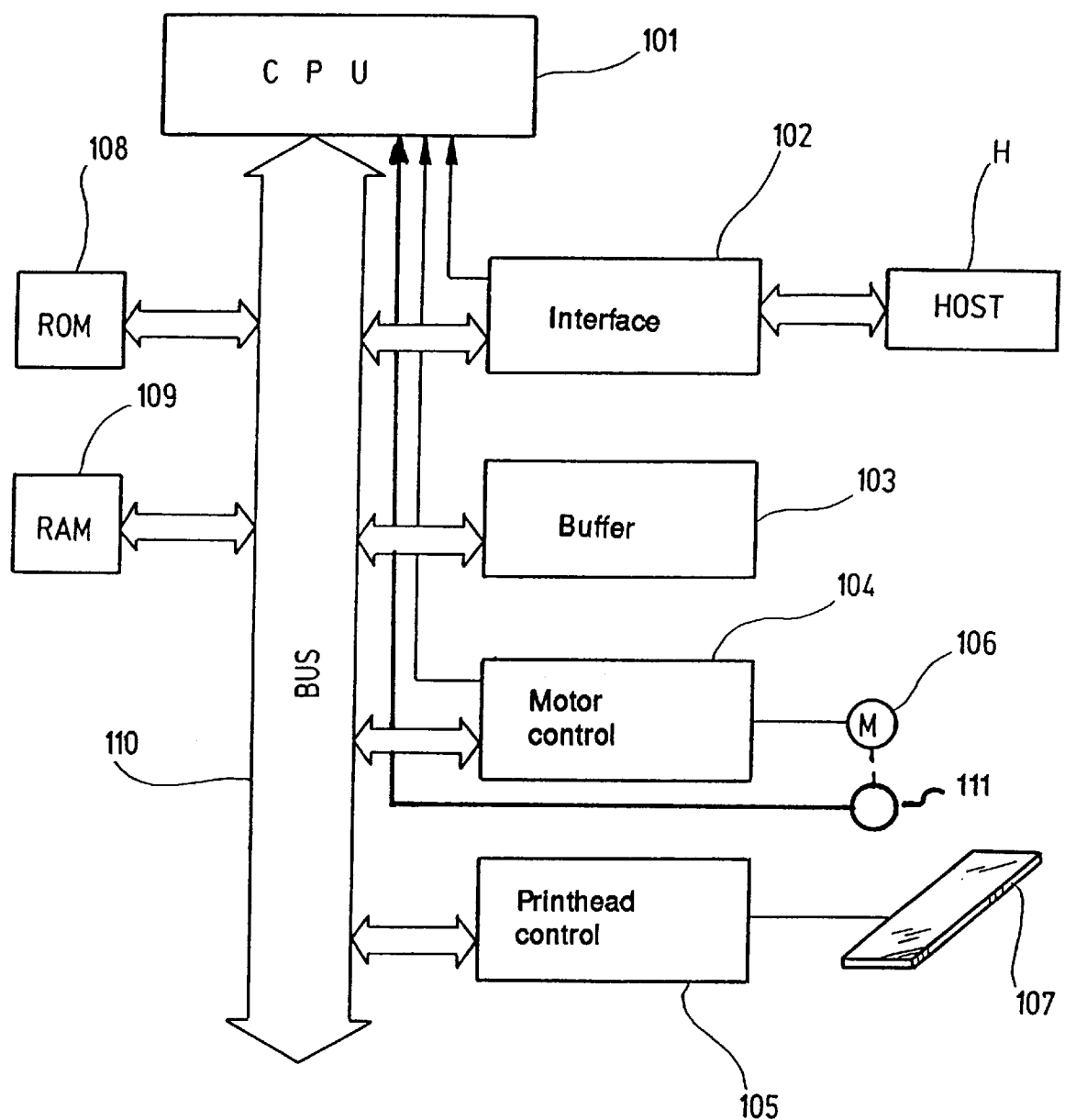
FIG. 2 shows a block diagram of a preferred embodiment of the label printing apparatus.

FIG. 2 shows a preferred embodiment of the control circuit of the present invention. In FIG. 2, 101 is a CPU of, for example, microprocessor type to control each part of the printer 1. Interface part 102 controls, between the printer 1 and an external host device H, receiving and transmitting image receiving data relating to recording and control signals from host device H. A buffer memory 103 is for temporary storing image data transferred from host device H. A conveying means control part 104 controls the conveying speed of the tape-like medium and outputs signals to inform CPU 101 and record control part 105, respectively such that the record timing can be controlled in accordance with the conveying speed. The DC motor 106 is controlled by means of the conveying means control part 104. The DC motor is further provided with an encoder 111 on the motor shaft which allows the software to control the speed of the tape transport mechanism. This is performed as described in U.S. Pat. No. 5,608,443, the content of which is incorporated herein by reference. The print speed has been designed to be variable between two limits of e.g., 5 mm/s and 20 mm/s. The encoder 111 is also used to synchronize the print head 16 strobe signal to ensure that columns of print are separated by a constant spacing.

A control algorithm is used to maintain the speed at the predetermined speed. This is achieved by pulse width modulation (PWM) of the motor drive transistor. In general terms, if the time interval between successive motor encoder pulses is longer than the nominal interval, the PWM duty-cycle is increased to speed up the motor, and if it is shorter the duty-cycle is decreased to slow the motor. Maximum and minimum PWM limits will be set in order to detect error conditions such as a tape jam or misfeed.

Record control part 105 supplies to a record head 107 the predetermined record data transferred from a buffer memory part 103 in synchronicity with record timing signal P. Record head unit 107 is a line head to record each line of a record medium. The record head unit 107 is a thermal print head in the present embodiment, but can be an ink jet recording head as well.

The ROM 108 and the RAM 109 contain the programs or data which are needed for controlling the CPU 101. The bus line 110 connects the CPU 101 with the other parts mentioned above.

The actual print speed is controlled considering the following two conditions:

(1) The volume of data available for printing; and (2) The number of energized dots of the print pattern.

The algorithms to derive the required speed for each of these factors is described below. The final speed is then selected as the lowest of these two speeds.

The volume of print data available can be governed by expansion routines which create dot data (e.g. from Bezier data) and add character attributes etc. (e.g. bold, outline). This is especially the case when the tape printer 1 has its own display and keyboard included in the housing of the printing mechanism. When the printer 1 is connected to the host H (e.g., a PC), like in the present embodiment, the print speed is adjusted according to the volume of data in the print buffer 103 received from the host H. The reason for controlling the speed of the tape 4 according to the number of available data is to prevent the printer 1 from running out of data and being forced to stop the tape motion. It is important to prevent the motor 106 from stopping because print position registration may be lost resulting in poor print quality in contrast to a stepper motor which can be stopped and maintain registration. In order to avoid the necessity to stop the tape motor 106 and printing process while waiting for data from the host H, the print speed is varied according to the amount of data remaining in the print buffer 103.

Figure 3:
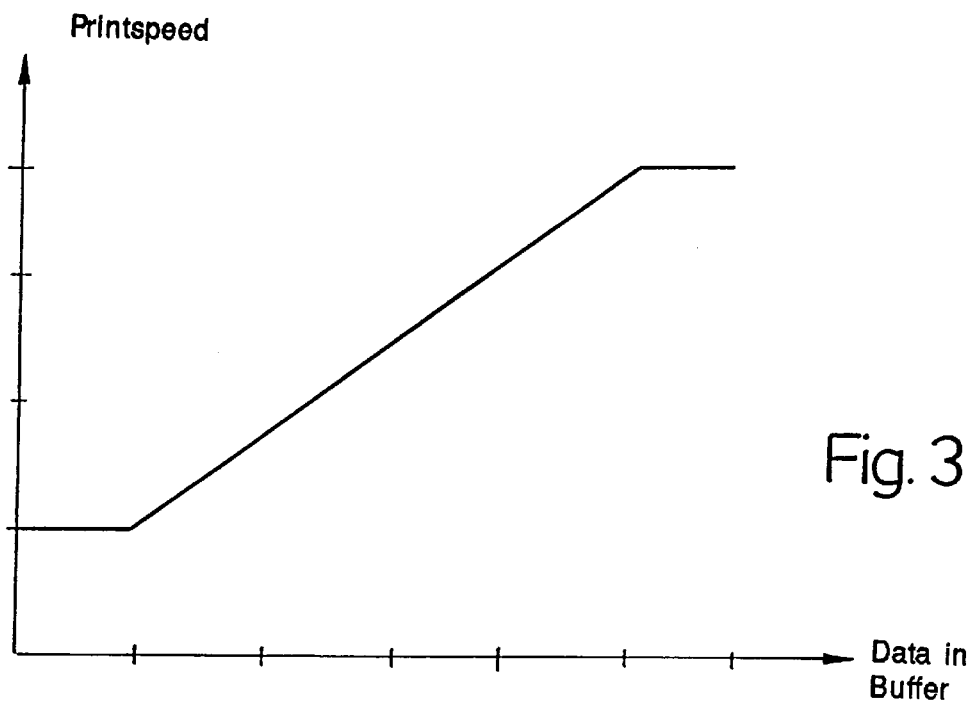
FIG. 3 shows the relation between contents of the image buffer and the predetermined print speed.

An example of the relation between print speed and the amount of data in the buffer 103 is given in FIG. 3. The required print speed is constant at a relatively low level when the number of data in the buffer 103 is below a first threshold. It should be noted that the speed is zero when there are no data at all. The same is valid when data transmission from the host starts: initially, it waits until the amount of received data exceeds a predetermined threshold, which can be the first threshold or higher. This avoids having the label printing apparatus 1 stop when all received data have been printed in the case of an extremely low data transmission speed. When the amount of data exceeds the above-mentioned first threshold, the required print speed increases linearly with the amount of data until the latter reaches a second threshold. When the amount of data in the buffer 103 exceeds this second threshold, the required print speed is kept constant at a maximum speed, independent of the amount of data in the buffer 103.

The power to print a complete column of, e.g., 192 pixels of black dots at the maximum speed requires a larger power supply than is generally needed for normal print conditions. Limiting the maximum printing speed for regions of the label where the print blackness is high reduces the maximum power required. The advantage of this is that a smaller and therefore lower cost power supply can be used. As most label designs will not have high density regions the speed will usually not have to be reduced. The blackness V of the label is measured using an exponentially decreasing accumulator, which takes into account not only of the present print column but also print data from previous columns. The most recent print columns have a greater weighing than previous columns. The algorithm can be written algebraically as:

$$V = A \times B + C,$$

wherein C is the number of dots to be activated (printed) in the present printing cycle and B is the value V of the previous printing cycle. The blackness V is the value which is used to govern the speed of printing. The factor A represents the "time constant" of the count, i.e. a value standing for the time required by the printing elements to cool down after activation and must be between 0 and 1. A high value for A means that previous column data will have a higher weighing in the current blackness value. A low value for A means that previous columns will have a less effect of the current value.

Figure 4:
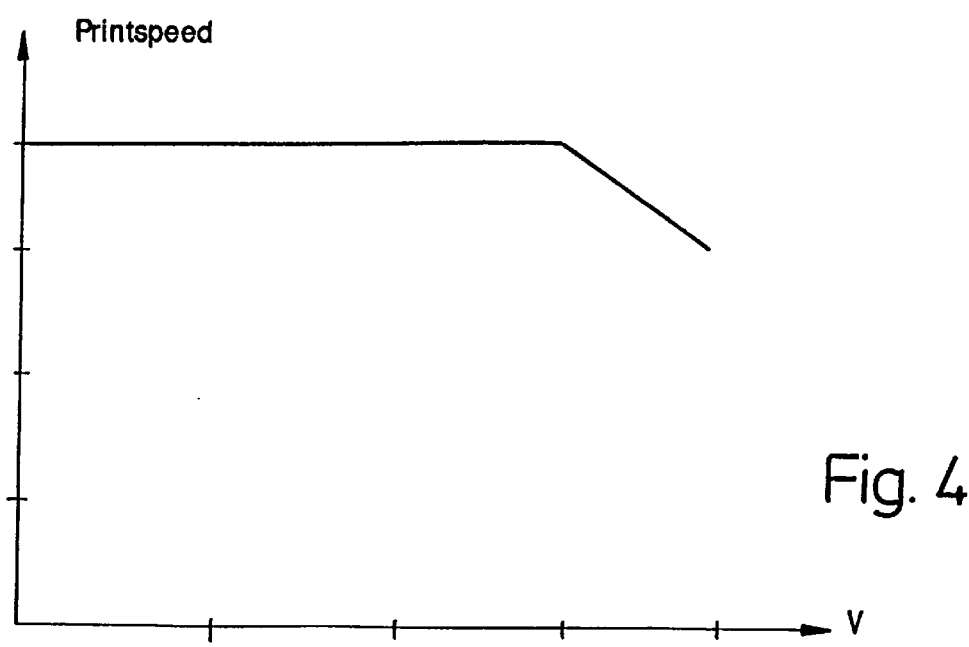
FIG. 4 shows the relation between a value V and the predetermined print speed.

FIG. 4 shows the relation between a value V and the predetermined print speed. The predetermined print speed is reduced from its maximum when the blackness value exceeds a preset threshold. As the blackness V increases towards an 'All-Black' value (i.e., continuous black printing) the speed is reduced further linearly.

In some cases it may be necessary to stop printing. This can occur when the host computer to which the printer is connected is a slow one, and the label is very complicated, such that the PC may not be able to supply data fast enough for continuous printing even at the slowest speed. In this situation, the buffer 103 of the printer will become empty and the printer must stop until more data is sent. The proposed solution to this problem is to slow down the print speed to the minimum print speed as the buffer 103 becomes empty. Then, the motor 106 is turned off before the buffer 103 is completely empty. Preferably, this is performed approximately 4 lines before the buffer becomes entirely empty.

The encoder 111 is then used to monitor the movement of the tape 4 after the motor 106 is turned off, since the motor is likely to continue moving for some small distance. Using the encoder 111, the remaining data in the buffer 103 will be used to print on the print positions during the time the motor 106 is switched off. This is of course only the case when the tape moves past the print position, and not when it is an entirely blank space.

When the tape 4 stops, printing will be disabled. This is to prevent accidental movement of the tape 4 from causing unwanted printing, since the print head 107 is controlled by means of the encoder 111. The information when the tape 4 stopped can be obtained by applying a time-out to the encoder pulses from the motor 106.

When sufficient data has been received to fill the buffer to a reasonable level, as for example indicated in FIG. 3, printing will start again. The first line after stopping will be printed with 15% more dot energy than normal, consequently the strobe time will be enlarged. The first line is printed on the first pulse from the encoder 111 after starting the motor 106.

It should be noted that normally the data transfer rate will be high enough for the buffer 103 to have more than four print lines of data in it. At the end of a label, the buffer 103 will always become empty. If an advance command for moving the next portion of tape 4 into the print position or a cut command for bringing the tape 4 into the cut position has already been sent to the printer when the buffer is almost empty, then the motor 106 will not stop until all the data has been printed.

If more data is sent after the motor 106 has been turned off, but before it has completely stopped, then the motor 106 will not be turned on again until after the motor 106 has completely stopped.

The capability of stopping during printing can be used to shorten the leader and trailer of a label by stopping in the middle of the label, cutting and continuing to print.

The foregoing description is only illustrative of the principle of the present invention. It is to be recognized and understood that the invention is not to be limited to the exact configuration as illustrated and described herein. Accordingly, all expedient modifications readily attainable by one versed in the art from the disclosure set forth herein that are within the scope and spirit of the present invention are to be included as further embodiments of the present invention. The scope of the present invention accordingly is to be defined as set forth in the appended claims.

What is claimed is:

1. A label printing apparatus for printing image data onto an elongated recording medium comprising:

memory means for storing image data to be printed onto said recording medium;

recording means for recording the image data dot wise onto said recording medium in subsequent printing cycles;

conveying means for conveying the recording medium relative to said recording means;

means for determining the volume of dots to be activated in each printing cycle; and speed adjustment means for controlling the speed of said conveying means based on the volume of image data stored in the memory means or the number of dots to be activated and available for printing in the present printing cycle, wherein the speed adjustment means calculates a first predetermined speed dependent on the volume of image data dots stored in the memory means and available for printing and a second predetermined speed dependent on the number of dots to be activated in the present printing cycle and the number of dots activated in a previous printing cycle, the speed adjustment means reducing the second predetermined speed linearly with respect to a maximum speed depending on a value V when the value V exceeds a predetermined threshold level, wherein the value V is determined according to the equation $$V = A \times B + C,$$

wherein C is the number of dots to be activated in the present printing cycle and B is the value V of the previous printing cycle and A is between 0 and 1.

2. A label printing apparatus of claim 1, wherein the speed adjustment means and available for printing calculates a first predetermined speed dependent on the volume of image data dots stored in the memory means and available for printing and a second predetermined speed dependent on the number of dots to be activated in the present printing cycle, and controls the speed of the conveying means according to the lower one of the first predetermined speed and the second predetermined speed.

3. A label printing apparatus of claim 2, wherein the speed adjustment means reduces the first predetermined speed when the volume of image data stored in the memory means and available for printing is below a predetermined threshold level.

4. A label printing apparatus of claim 3, wherein the speed adjustment means maintains the first predetermined speed at a constant when the volume of image data in the memory means available for printing falls below a first threshold level.

5. A label printing apparatus of claim 3, wherein the speed adjustment means maintains the first predetermined print speed at a maximum speed independent of the volume of image data in the memory means when the volume of data in the memory means available for printing exceeds a second threshold level.

6. A label printing apparatus of claim 3, wherein the speed adjustment means increases the first predetermined print speed linearly with the volume of data in the memory means available for printing when the volume of data exceeds the first threshold level and is below the second threshold level.

7. A label printing apparatus of claim 2, wherein the speed adjustment means further determines the second predetermined speed depending on the number of dots activated in a previous printing cycle.

8. A label printing apparatus of claim 1 further comprising means for controlling the energy submitted to the recording means in each printing cycle in response to the speed of said conveying means.

9. A label printing apparatus of claim 1, wherein said recording means is a thermal print head.

10. A label printing apparatus of claim 1 further comprising an interface connectable to a host.

11. A label printing apparatus of claim 10, wherein after the beginning of a data transmission from a host, the speed adjustment means activates the conveying means only when the volume of data stored in the memory means and available for printing exceeds a predetermined threshold level.

12. A label printing apparatus of claim 10 further comprising means for switching a power supply of the label printing apparatus on in response to incoming data from the host.

13. A label printing apparatus of claim 10 further comprising means for detecting the movement of one of the recording medium or an ink ribbon, and means for providing an error message in response to an error in the recording medium or ink ribbon movement detected by the movement detecting means.

14. A label printing apparatus of claim 13, wherein the movement detecting means comprises a microswitch which interacts with at least one of a cam operatively connected to a tape unwind wheel, a cam operatively connected to an ink ribbon unwind wheel and a cam operatively connected to an ink ribbon rewind wheel.

15. A label printing apparatus for printing image data onto an elongated recording medium comprising:

memory means for storing image data to be printed onto said recording medium;

recording means for recording the image data dot wise onto said recording medium in subsequent printing cycles;

conveying means for conveying the recording medium relative to said recording means;

means for determining the number of dots to be activated in each printing cycle; and speed adjustment means for controlling the speed of said conveying means based on the volume of image data stored in the memory means or the number of dots to be activated and available for printing in the present printing cycle, wherein said speed adjustment means drives said conveying means at a minimum print speed when the memory means is provided with printing data at a rate which is lower than that at which data is sent to said recording means when printing at the minimum print speed, the speed adjustment means switching the power of said conveying means off before the volume of data in the memory means and available for printing becomes zero, the recording means being controlled to print the data stored in said memory means onto said recording medium when the conveying means stops entirely, wherein the recording means is controlled by a recording medium movement sensing means for sensing the movement of the recording medium, and wherein the speed adjustment means controls the conveying means to resume conveying and the recording means to resume recording once the volume of data stored in said storing means and available for printing exceeds a predetermined threshold level.

16. A label printing apparatus of claim 15, wherein the recording means is provided with an enlarged recording energy during printing of a first printing line with respect to printing of printing lines following said first printing line.

17. A label printing apparatus of claim 15, wherein the recording means is disabled when the conveying means is not moving.

18. A label printing apparatus of claim 15, wherein said conveying means comprises a DC motor.

19. A label printing apparatus for printing image data onto an elongated recording medium comprising:

a memory for storing image data to be printed onto said recording medium;

a print head for recording the image data dot wise onto said recording medium in subsequent printing cycles;

a motor for conveying the recording medium relative to said print head;

a print buffer for determining the number of dots to be activated in each printing cycle; and a speed adjuster for controlling the speed of said motor based on the number of image data stored in the memory or the number of dots to be activated in the present printing cycle, wherein the speed adjustment means calculates a first predetermined speed dependent on the volume of image data dots stored in the memory means and available for printing and a second predetermined speed dependent on the number of dots to be activated in the present printing cycle and the number of dots activated in a previous printing cycle, the speed adjustment means reducing the second predetermined speed linearly with respect to a maximum speed depending on a value V when the value V exceeds a predetermined threshold level, wherein the value V is determined according to the equation $$V = A \times B + C,$$

wherein C is the number of dots to be activated in the present printing cycle and B is the value V of the previous printing cycle and A is between 0 and 1.

* * * * *

UNITED STATES PATENT AND TRADEMARK OFFICE
CERTIFICATE OF CORRECTION

PATENT NO. : 5,957,596

DATED : September 28, 1999

INVENTOR(S) : Nicholas James Hastings et al.

It is certified that error appears in the above-identified patent and that said Letters Patent is hereby corrected as shown below:

On the title page at [75] Inventors: change the city of residence of Geert Heyse from "Leeuwerikstraat" to --Katelijne Waver--.

Signed and Sealed this

Twenty-fifth Day of April, 2000

Attest:

Q. TODD DICKINSON

Attesting Officer

Director of Patents and Trademarks